(12) United States Patent
Dubey et al.

(10) Patent No.: US 8,549,634 B2
(45) Date of Patent: Oct. 1, 2013

(54) METHOD AND APPARATUS FOR DETECTING A ROGUE ACCESS POINT IN A COMMUNICATION NETWORK

(75) Inventors: Pradip K. Dubey, Karnataka (IN); Jitesh Narayan Verma, Karnataka (IN)

(73) Assignee: Symbol Technologies, Inc., Holtsville, NY (US)

( * ) Notice: Subject to any disclaimer, the term of this patent is extended or adjusted under 35 U.S.C. 154(b) by 7 days.

(21) Appl. No.: 13/293,867

(22) Filed: Nov. 10, 2011

(65) Prior Publication Data

US 2012/0124665 A1    May 17, 2012

(51) Int. Cl.
*G06F 11/00* (2006.01)
(52) U.S. Cl.
USPC ................................. 726/22; 726/4
(58) Field of Classification Search
USPC ..................................... 726/22–25
See application file for complete search history.

(56) References Cited

U.S. PATENT DOCUMENTS

| 7,823,199 | B1 * | 10/2010 | Rathi et al. | 726/22 |
| 2005/0213549 | A1 * | 9/2005 | Bridge et al. | 370/338 |
| 2006/0200862 | A1 * | 9/2006 | Olson et al. | 726/23 |
| 2009/0235354 | A1 * | 9/2009 | Gray et al. | 726/22 |
| 2009/0296598 | A1 * | 12/2009 | Harvey et al. | 370/252 |

\* cited by examiner

*Primary Examiner* — Carl Colin
*Assistant Examiner* — Don Zhao

(57) ABSTRACT

A method and apparatus for detecting a rogue access point in a communication network is described herein. The method includes a probing unit sending a pre-detection message to an associated access point in the communication network. The pre-detection message indicates a start of rogue access point detection mode and informs the associated access point not to respond to probe requests following the pre-detection message. The method further includes the probing unit broadcasting probe requests in the communication network. The probing unit detect that one or more of the plurality of access points is the rogue access point based on receiving a probe response in reply to the broadcasted probe request from the rogue access point. A method for detecting a rogue access point includes broadcasting a probe request with a proprietary information bit and detecting the rogue access point based on receiving a probe response for the broadcasted probe request.

12 Claims, 8 Drawing Sheets

METHOD AND APPARATUS FOR DETECTING A ROGUE ACCESS POINT IN A COMMUNICATION NETWORK

FIELD OF THE DISCLOSURE

The present disclosure relates generally to communication networks and more specifically to a method and apparatus for detecting a rogue access point in a communication network.

BACKGROUND

Security is a concern for any communication network, especially in a wireless environment. There is a major concern with respect to security in wireless communication networks as they are easily susceptible to security threats from an external intruder device also known as a rogue device. The rogue device can act like an authorized access point in the wireless communication network and thereby eavesdrop or spoof the wireless communication network. There are various methods to detect a rogue device in a wireless communication network.

In one method, client devices in the wireless communication network can scan for beacons from a rogue device and thereby detect it. However, this method is passive in nature because the client device has to wait for a beacon from the rogue device in order to detect it. In another method, the wireless communication network can employ radio frequency scanning by employing sensors in the wireless communication network. However, the drawback with this method is there is a possibility of missing the detection of rogue devices if present in an area not covered by the sensor. In one another method, access points in the wireless communication network can scan for the rogue device, however, this is limited to a very short range Accordingly, there is a need for a method and apparatus for detecting a rogue access point in a communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
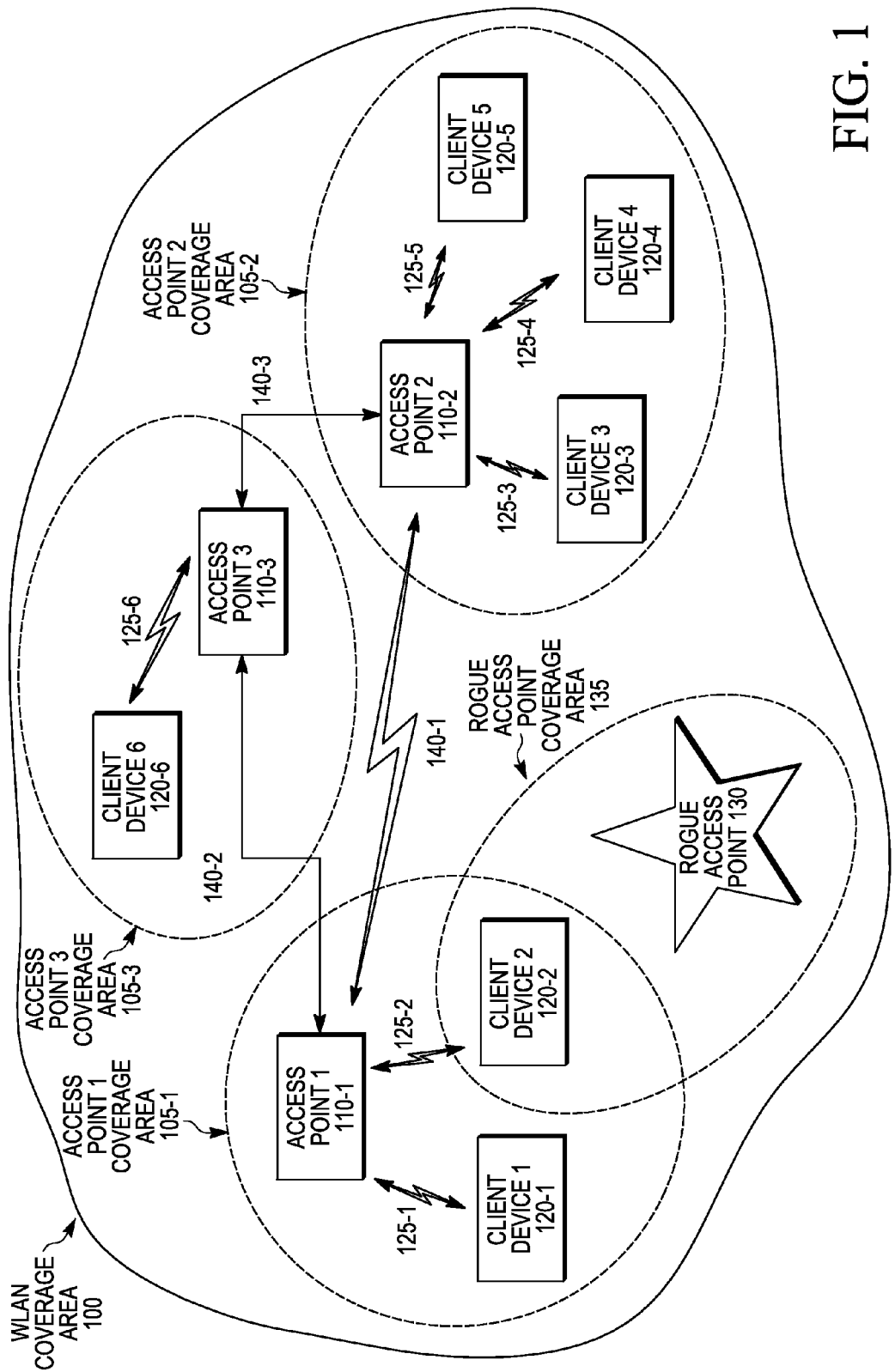
FIG. 1 is a block diagram of a communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and apparatus for detecting a rogue access point in a communication network is described herein. The method includes a probing unit sending a pre-detection message to an associated access point in the communication network. The pre-detection message indicates a start of rogue access point detection mode and informs the associated access point not to respond to probe requests following the pre-detection message. The associated access point forwards the pre-detection message to all the other access points in the communication network. The method further includes the probing unit broadcasting probe requests to all the access points in the communication network and also to the rogue access point. The probing unit detects that one or more of the plurality of access points is the rogue access point based on receiving a probe response in reply to the broadcasted probe request from the rogue access point. The probing unit further sends a post-detection message indicating the end of rogue access point detection mode.

In accordance with some embodiments, the probing unit includes a proprietary information bit in the broadcast probe request itself, wherein the proprietary information bit indicates the access points in the communication network not to respond to the probe request. The probing unit detects the rogue access point based on a probe response from the rogue access point.

Referring to the figures, FIG. 1 is a block diagram of a communication network 100 for detecting a rogue access point in the communication network 100 in accordance with some embodiments. In accordance with some embodiments the communication network 100 is a wireless local area network (WLAN) such as, Institute of Electrical and Electronics Engineers (IEEE) 802.11, 802.11a, 802.11b, 802.11g, 802.11n networks and the like. The teachings herein are not limited to WLAN and can also be applied to other networks such as, IEE 802.16/Worldwide Interoperability for Microwave Access (WiMax), Bluetooth Network, Cellular Communication Network, and the like.

Referring to FIG. 1, the communication network 100 includes a plurality of access points (APs) 110-1, 110-2, and 110-3 authorized to the communication network 100 and having a coverage area 105-1, 105-2, and 105-3, respectively. Each coverage area 105-1, 105-2, 105-3 includes a plurality of client devices 120-1, 120-2, 120-3, 120-4, 120-5, and 120-6 serviced by their respective APs 110-1, 110-2, and 110-3. As used herein, the AP 110-1, 110-2, 110-3 is an infrastructure device that can communicate information with one or more client devices 120-1, 120-2, 120-3, 120-4, 120-5, and 120-6 via logical channels 125-1, 125-2, 125-3, 125-4, 125-5, and 125-6, respectively. An access point 110-1, 110-2, 110-3 includes, but is not limited to, equipment commonly referred to as base transceiver stations, routers or any other type of client device interfacing unit in a wireless environment As referred to herein, a client device (one of 120-1, 120-2, 120-3, 120-4, 120-5, and 120-6) includes, but is not limited to, devices commonly referred to wireless communication devices such as mobile radios, mobile stations, subscriber units, access terminals, mobile devices, or any other device capable of operating in a wireless environment. Examples of communication devices include, but are not limited to, two-way radios, mobile phones, cellular phones, Personal Digital Assistants (PDAs), laptops and pagers.

Returning to FIG. 1, an external element or an intruder such as a rogue access point (rogue AP) 130 having a coverage area 135 can enter the communication network 100, thereby posing a threat to the security of the communication network 100. In accordance with one embodiment, a probing unit in the communication network detects such rogue AP by sending a proprietary message specific to the communication network 100. The proprietary message includes messages specific to protocols standards such as, IEEE 802.11, 802.11a, 802.11b, 802.11g, 802.11n protocols, Bluetooth protocol, wireless network management (WNMP) protocol, or any protocol specific to the communication network 100. The proprietary message informs all the APs (e.g, 110-1, 110-2, 110-3) authorized to the communication network 100 not to respond to a probe request following the proprietary message. The proprietary message is not sent to the rogue AP 130, however, the probe request is broadcast to the rogue AP 130. Since the rogue AP 130 is unaware of the proprietary message, the rogue AP 130 responds to the probe request. The probing unit detects the rogue AP 130 based on a probe response received from the rogue AP 130.

In accordance with another embodiment, instead of sending a proprietary message, the probing unit includes a proprietary information bit in the broadcast probe request. The proprietary information bit is detected by the APs 110-1, 110-2, and 110-3 in the communication network 100 and do not respond to the probe request. Since, the rogue AP 130 is not aware of the proprietary information bit it responds to the probe request. The probing unit detects the rogue AP 130 based on a probe response received from the rogue AP 130.

Only a limited number APs, client devices, and rogue AP are shown for ease of illustration. However, communication network 100 can include any number of APs to support any number of client devices based on system requirements. The communication network 100 can also include any number of rogue APs attacking the communication network 100. Moreover, embodiments are not dependent on the protocol(s) used to facilitate communications in the system and can be used with any such protocols.

In general, communication links (also referred to herein as communication channels or channels) comprise the physical communication resources over which information is sent between different elements in the communication network 100 and can include wired links or wireless links (e.g., 125-1, 125-2, 125-3, 125-4, 125-5, 125-6, 140-1, 140-2, and 140-3) with a wireless interface between the equipment in the communication network 100 being defined by the protocols implemented in the communication network 100. For example, as illustrated in FIG. 1, the APs 110-1, 110-2, and 110-3 can communicate with the client devices 120-1 and 120-2, 120-3, 120-4, and 120-5, and 120-6 via the wireless links 125-1 and 125-2, 125-3, 125-4, and 125-5, and 125-6, respectively. In one embodiment, the client device (one of 120-1 through 120-6) can send a pre-detection message and a post-detection message to an AP (one of 110-1, 110-2, 110-3) to which it is associated with through the corresponding wireless link (one of 125-1, 125-2, 125-3, 125-4, 125-5, and 125-6). Further, the APs 110-1, 110-2, and 110-3 communicate with each other through wired or wireless links. For example, as illustrated in FIG. 1, the APs 110-1 and 110-2 communicate through a wireless link 140-1, the APs 110-1 and 110-3 communication through wired link 140-2, and the APs 110-2 and 110-3 communication through wired link 140-3. The APs 110-1, 110-2, and 110-3 can use these links 140-1, 140-2, and 140-3 to forward the pre-detection and post-detection message received from an associated client device when operating in a normal mode. In another embodiment, the APs can use the links 140-1, 140-2, and 140-3 to send the pre-detection and the post-detection messages when operating in a probe mode.

The embodiments are described in the context of a WLAN network for ease of illustration. However, the embodiments are not limited to such a network but can be applied within any other network that employs similar carrier frequencies and network services.

Figure 2:
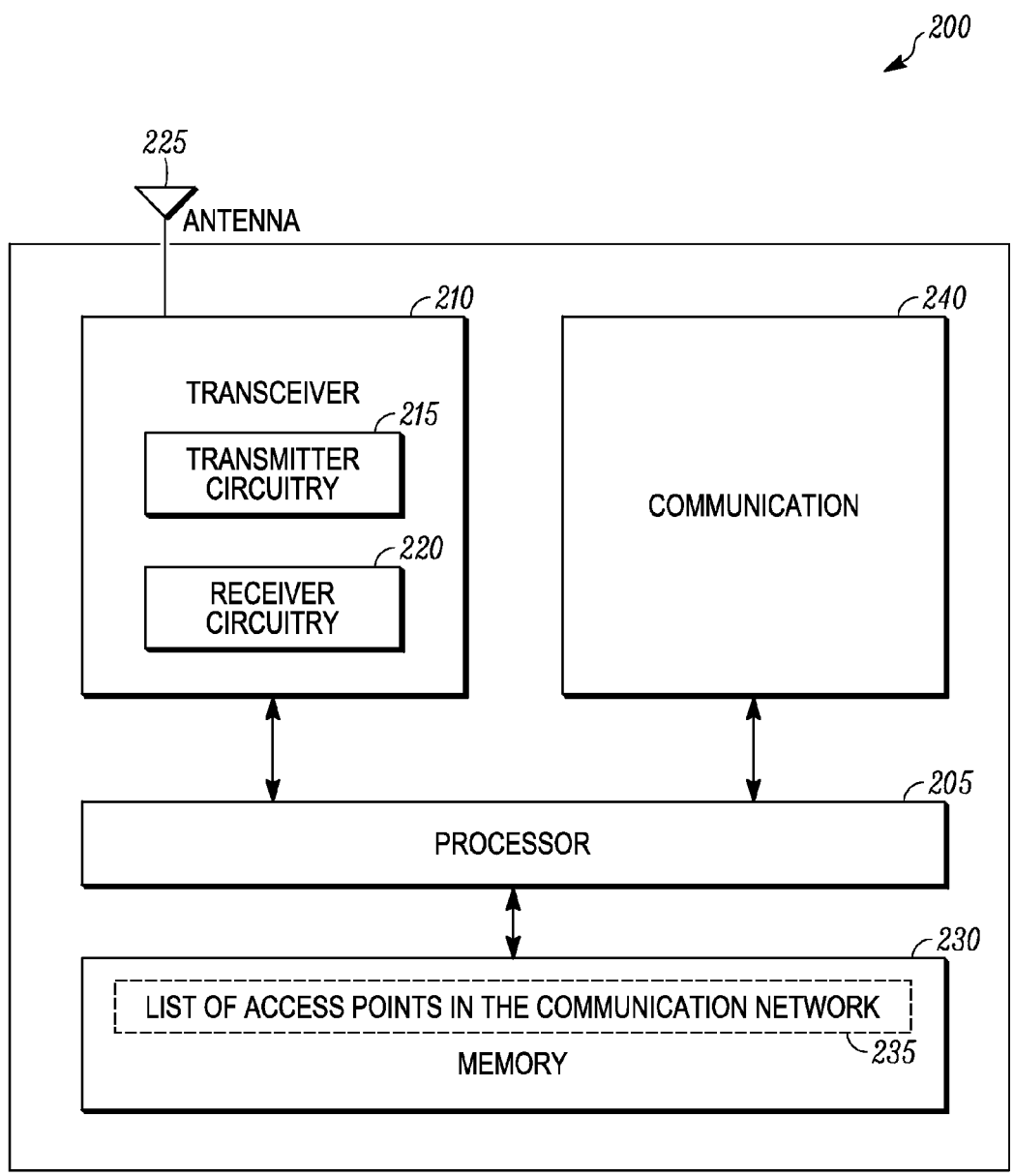
FIG. 2 is a block diagram illustrating an embodiment of a communication device employed in the communication network of FIG. 1.

FIG. 2 is a block diagram of a communication device 200 illustrating the internal components according to one embodiment. In one embodiment, the communication device 200 can be one of the client devices 120-1 through 120-6 in the communication network 100. In another embodiment, the communication device 200 can be one of the APs 110-1, 110-2, 110-3 in the communication network 100 operating in a probe mode. The communication device 200 includes a processor 205, a transceiver 210 including a transmitter circuitry 215 and a receiver circuitry 220, an antenna 225, a memory 230 for storing operating instructions that are executed by the processor 205, and a communication interface 240. Although not shown, the communication device 200 also can include an antenna switch, duplexer, circulator, or other highly isolative means (not shown) for intermittently providing radio signals from the transmitter circuitry 215 to the antenna 225 and from the antenna 225 to the receiver circuitry 220. The communication device 200 is an integrated unit containing at least all the elements depicted in FIG. 2, as well as any other elements necessary for the communication device 200 to perform its particular electronic function. Alternatively, communication device 200 can comprise a collection of appropriately interconnected units or devices, wherein such units or devices perform functions that are equivalent to the functions performed by the elements of the communication device 200.

The processor 205 includes one or more microprocessors, microcontrollers, DSPs (digital signal processors), state machines, logic circuitry, or any other device or devices that process information based on operational or programming instructions. Such operational or programming instructions are stored in the memory 230. The memory 230 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 205 has one or more of its functions performed by a state machine or logic circuitry, the memory 230 containing the corresponding operational instructions can be embedded within the state machine or logic circuitry. The operations performed by the processor 205 and the other elements of the communication device 200 are described in detail below.

In one embodiment, the transmitter circuitry 215 and the receiver circuitry 220 enable the communication device 200 to communicate radio signals to and acquire signals from the APs 110-1 through 110-3 in the communication network. In another embodiment, the transmitter circuitry 215 and the receiver circuitry 220 enable the communication device 200 to communicate radio signals to and acquire signals from the client devices 120-1 through 120-6 in the communication network 100. In this regard, the transmitter circuitry 215 and the receiver circuitry 220 include appropriate, conventional circuitry to enable digital or analog transmissions over a wireless communication channel. The implementations of the transmitter circuitry 215 and the receiver circuitry 220 depend on the implementation of the communication device 200. For example, the transmitter circuitry 215 and the receiver circuitry 220 can be implemented as an appropriate wireless modem, or as conventional transmitting and receiving components of two-way wireless communication devices. In the event that the transmitter circuitry 215 and the receiver circuitry 220 are implemented as a wireless modem, the modem can be internal to the communication device 200 or insertable into the communication device 200 (e.g., embodied in a wireless radio frequency (RF) modem implemented on a Personal Computer Memory Card International Association (PCMCIA) card or a universal serial bus (USB) card). For a wireless communication device, the transmitter circuitry 215 and the receiver circuitry 220 are implemented as part of the wireless device hardware and software architecture in accordance with known techniques. One of ordinary skill in the art will recognize that most, if not all, of the functions of the transmitter circuitry 215 and/or the receiver circuitry 220 can be implemented in a processor, such as the processor 205. However, the processor 205, the transmitter circuitry 215, and the receiver circuitry 220 have been artificially partitioned herein to facilitate a better understanding.

The receiver circuitry 220 is capable of receiving radio frequency (RF) signals from at least one frequency band and optionally multiple frequency bands, when, for example, the communications with a proximate device are in a frequency band other than that of the system communications. The transceiver 210 includes one set of transmitter circuitry 215. The antenna 225 comprises any known or developed structure for radiating and receiving electromagnetic energy in the frequency range containing the wireless carrier frequencies. The communication interface 240 uses transceiver 210 to enable the communication device 200 to communicate with other devices and/or systems.

As illustrated in FIG. 2, the memory 230 stores a list 235 of APs that are authorized to be a part of the communication network 100.

Figure 3:
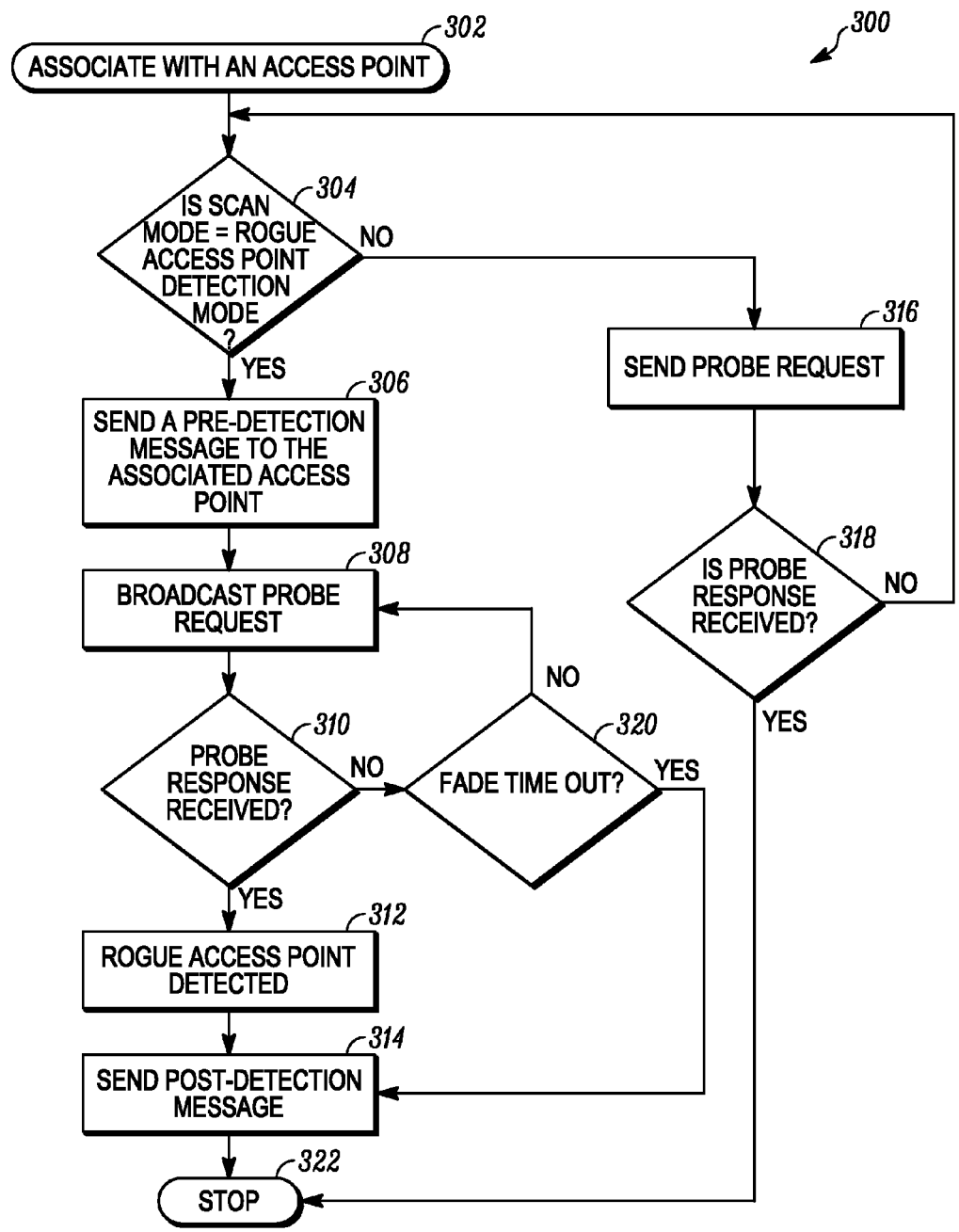
FIG. 3 illustrates a flow diagram of a method for detecting a rogue access point in a communication network in accordance with some embodiments.

FIG. 3 is a flow diagram of a method 300 performed by a probing unit for detecting a rogue access point (rogue AP) in the communication network 100. In one embodiment, the probing unit can be at least one of a plurality of client devices, for example, one of the client devices 120-1 through 120-6, in the communication network 100. In another embodiment, the probing unit can be at least one of the plurality of APs 110-1, 110-2, 110-3 in the communication network 100 operating in a probe mode. The probe mode of operation of an AP 110-1, 110-2, 110-3 can be defined as the mode wherein the AP sends a probe request to other devices such as other APs and rogue AP in the network in order to detect the rogue AP.

Referring to the method 300, to start with the probing unit associates 302 with at least one of the APs 110-1, 110-2, 110-3 in the communication network 100. In one example, the probing unit can be the client 120-1 associated with the corresponding AP 110-1, wherein the AP 110-1 operates in a normal mode. The normal mode of operation of an AP 110-1, 110-2, 110-3 can be defined as the mode wherein the AP receives a probe request from a probing unit and is similar to an in general operation of an AP in a communication network. After association 302, the probing unit determines 304 whether the scan mode is a normal scan mode or rogue AP detection mode. If the scan mode is a normal scan mode the probing unit sends 316 a probe request and determines 318 whether a probe response is received. If the probe response is received then the probing unit stops 322 the method 300. On the other hand, if no probe response is received in the normal scan mode the probing unit goes back to operation 304. The probe request and response sequences in the normal scan mode are already known in the art.

On the other hand, if the scan mode is rogue AP detection mode, the probing unit sends 306 a pre-detection message to the associated AP i.e, the AP to which the probing unit is associated with. The associated AP then forwards the pre-detection message to all the other APs in the communication network 100. In the present example, the client device 120-1 sends a pre-detection message to the AP 110-1 though the wireless communication link 125-1, the AP 110-1 further forwards the pre-detection message to the other APs 110-2 and 110-3 through the links 140-1 and 140-2, respectively. The APs 110-1, 110-2, and 110-3 are authorized to the communication network 100. The pre-detection message is a proprietary message specific to the communication network 100 and informs the APs 110-1, 110-2, and 110-3 authorized to the communication network 100 not to respond to a probe request following the pre-detection message. The probing unit then broadcasts 308 at least one probe request to the all the APs 110-1, 110-2, 110-3 in the communication network 100 and also to the rogue AP 130. The probe request is broadcast along all valid channels in the communication network 100. In the present example, the client device 120-1 broadcasts a probe request to the APs 110-1 through 110-3 and the rogue AP 130. After broadcasting the probe request the probing unit determines 310 whether a probe response is received. If a probe response is received then the probing unit confirms the detection 312 of rogue AP 130. Since the pre-detection message is sent only to the APs 110-1, 110-2, and 110-3 and not to the rogue AP 130, the rogue AP 130 is not aware of the pre-detection message and responds to the probe request.

Upon detecting 312 the rogue AP 130, the probing unit sends 314 a post-detection message to the associated AP, which in turn forwards the post-detection message to other APs in the communication network 100. The post-detection message indicates an end of the rogue AP detection mode and stops 322 the method 300. In the present example, upon detecting the rogue AP 130, the client device 120-1 sends a post-detection message to the associated AP 110-1, which in turn forwards the post-detection message to the other APs 110-2 and 110-3 in the communication network 100.

Referring to the method 300, operation 310, when the probe response is not received the probing unit determines 320 whether a predetermined time period expires. If the predetermined time period is not expired the probing unit proceeds to broadcast 308 probe requests. On the other hand, if the predetermined time period expires and no probe response is received the probing unit sends 314 a post-detection message and stops 322 the method 300. The predetermined time period can be specific to the communication network 100 in order to achieve a precise detection of the rogue AP 130. In one embodiment, the predetermined time period can be defined based on a time delay associated with sending the pre-detection or post-detection message to all the APs authorized to the communication network 100.

Figure 4:
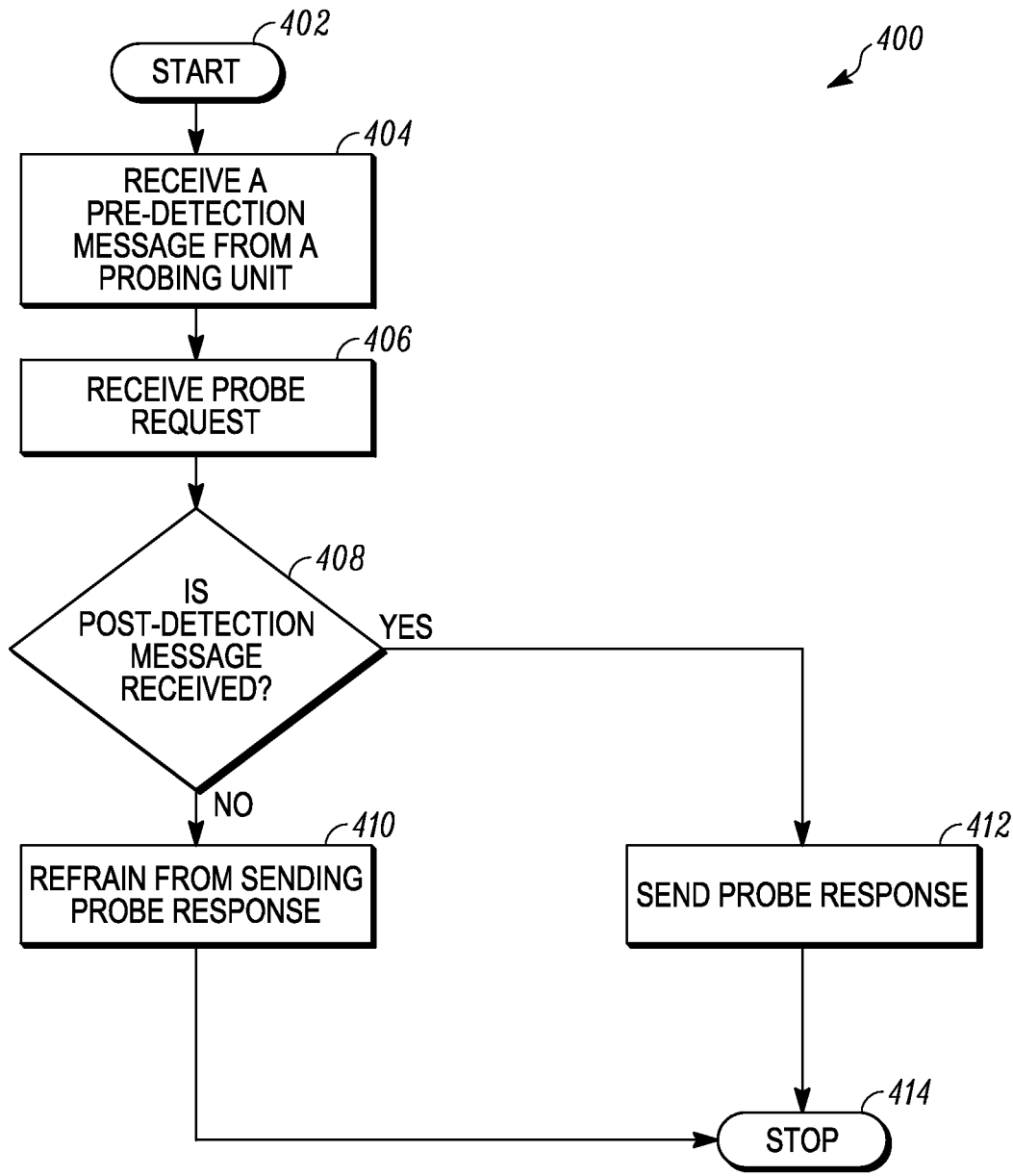
FIG. 4 illustrates a flow diagram of a method for detecting a rogue access point in a communication network in accordance with some embodiments.

FIG. 4 is a flow diagram of a method 400 performed by an access point, for example, the AP (one of 110-1, 110-2, and 110-3) in the communication network 100, in accordance with some embodiments. The method 400 is performed by the AP 110-1, 110-2, 110-3 when in a normal mode of operation.

Referring to the method 400, upon initialization 402, the AP 110-1, 110-2, 110-3 receives 404 a pre-detection message. The pre-detection message informs the AP 110-1, 110-2, 110-3 not to respond to the following probe requests. In one embodiment, the probing unit includes at least one of the client devices 120-1 through 120-6 in the communication network 100. The AP 110-1, 110-2, 110-3 receives the pre-detection message from the client device to which it is associated with or receive the pre-detection message forwarded by another AP to which the client device is associated with. In another embodiment the probing unit can be one of the APs 110-1, 110-2, and 110-3 operating in a probe mode. The AP 110-1, 110-2, 110-3 receives the pre-detection message from the AP operating in probe mode or receives the pre-detection message forwarded by another AP that is a neighbor to the AP operating in probe mode.

Returning to the method 400, after receiving 404 a pre-detection message, the AP 110-1, 110-2, 110-3 receives a probe request broadcast from the probing unit. The AP 110-1, 110-2, 110-3 determines 408 whether a post-detection message is received. In one embodiment, when the probing unit includes at least one of the client devices 120-1 through 120-6, the AP 110-1, 110-2, 110-3 receives the post-detection message from the client device to which it is associated with or receive the post-detection message forwarded by another AP to which the client device is associated with. In another embodiment, when the probing unit is one of the APs 110-1, 110-2, and 110-3 operating in a probe mode, the AP 110-1, 110-2, 110-3 receives the post-detection message from the AP operating in a probe mode or receives the post-detection message forwarded by another AP that is a neighbor to the AP operating in the probe mode. In the method 400, operation 408, if the post-detection message is not received the AP 110-1, 110-2, 110-3 understands that the received probe request is after the pre-detection message and is sent for detecting a rogue AP 130. The AP 110-1, 110-2, 110-3 therefore refrains 410 from responding to the probe request and stops 414 with the method 400. On the other hand, if the post-detection message is received the AP 110-1, 110-2, 110-3 understands that the received 406 probe request is a normal probe request and replies to the probe request by sending 412 a probe response and stops 414 with the method 400.

Figure 5:
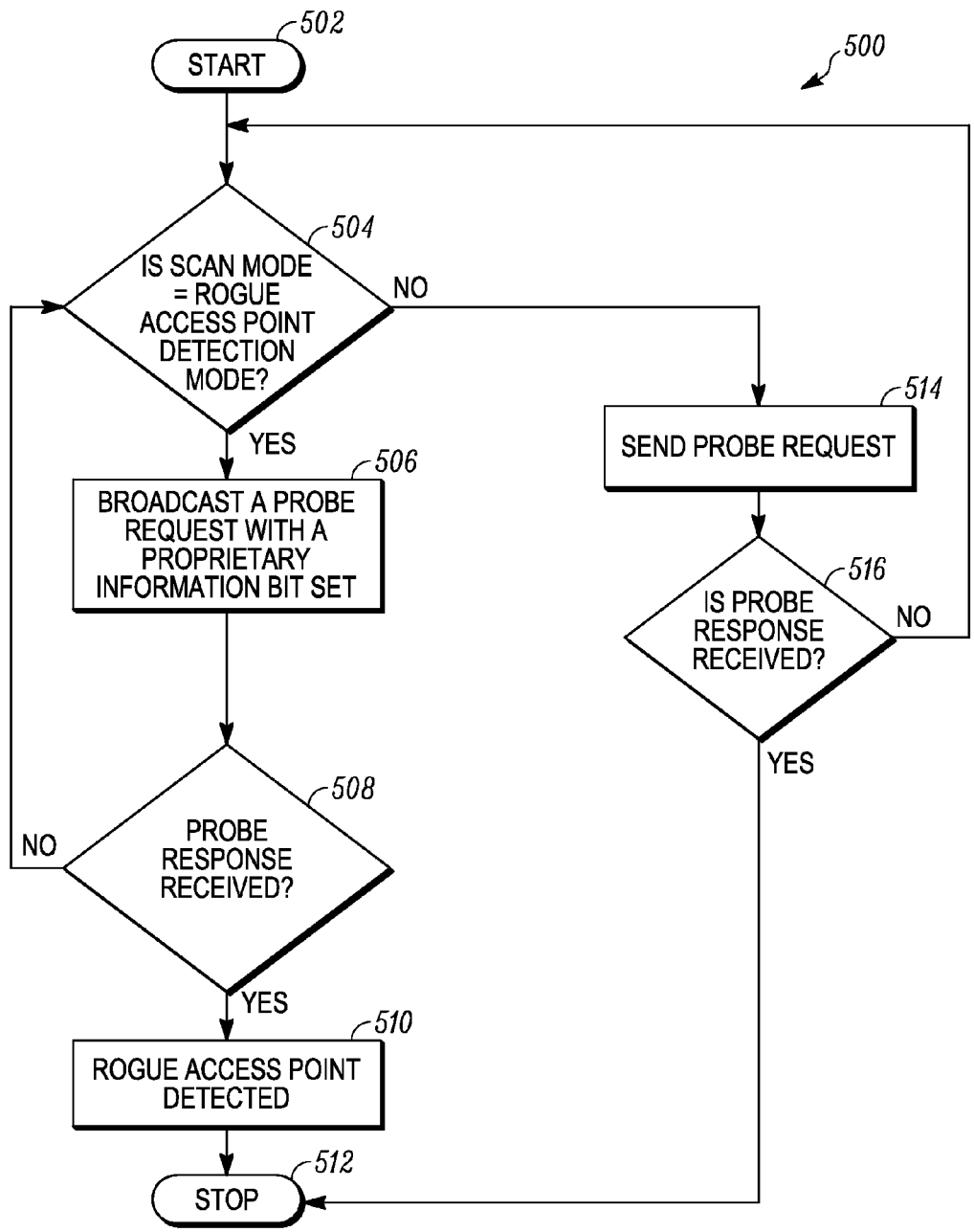
FIG. 5 illustrates a flow diagram of a method for detecting a rogue access point in a communication network in accordance with some embodiments.

FIG. 5 is a flow diagram of a method 500 performed by a probing unit for detecting a rogue access point (rogue AP) in the communication network 100. In one embodiment, the probing unit can be at least one of a plurality of client devices, for example, one of the client devices 120-1 through 120-6, in the communication network 100. In another embodiment, the probing unit can be at least one of the plurality of APs 110-1, 110-2, 110-3 in the communication network 100 operating in a probe mode.

Referring to the method 500, upon initialization 502, the probing unit determines 504 whether the scan mode is a normal scan mode or rogue AP detection mode. If the scan mode is a normal scan mode the probing unit sends 514 a probe request and determines 516 whether a probe response is received. If the probe response is received then the probing unit stops 512 the method 500. On the other hand, if no probe response is received in the normal scan mode the probing unit goes back to operation 502. The probe request and response sequences in the normal scan mode are similar to the probe request and response sequences in networks such as, but not limited to IEEE 802.11 networks and are already known in the art.

On the other hand, if the scan mode is rogue AP detection mode, the probing unit broadcast 506 a probe request with a proprietary information bit set. The proprietary information bit is specific to the communication network 100 and the setting of the proprietary information bit in the probe request indicates the APs 110-1, 110-2, and 110-3 authorized to the communication network 100 not to respond to the probe request. In one example, the client device 120-1 broadcasts a probe request to the APs 110-1, 110-2, and 110-3 and the rogue AP 130 with the proprietary information bit set, wherein the probe request is broadcast through all valid channels possible in the communication network 100. After broadcasting the probe request the probing unit determines 508 whether a probe response is received. If a probe response is received then the probing unit confirms the detection 510 of rogue AP 130 and stops 512 the method 500. Since the proprietary information bit is not understandable by the rogue AP 130, the rogue AP 130 responds to the probe request. On the other hand if no probe response is received the probing unit goes back to perform the operation 504.

Figure 6:
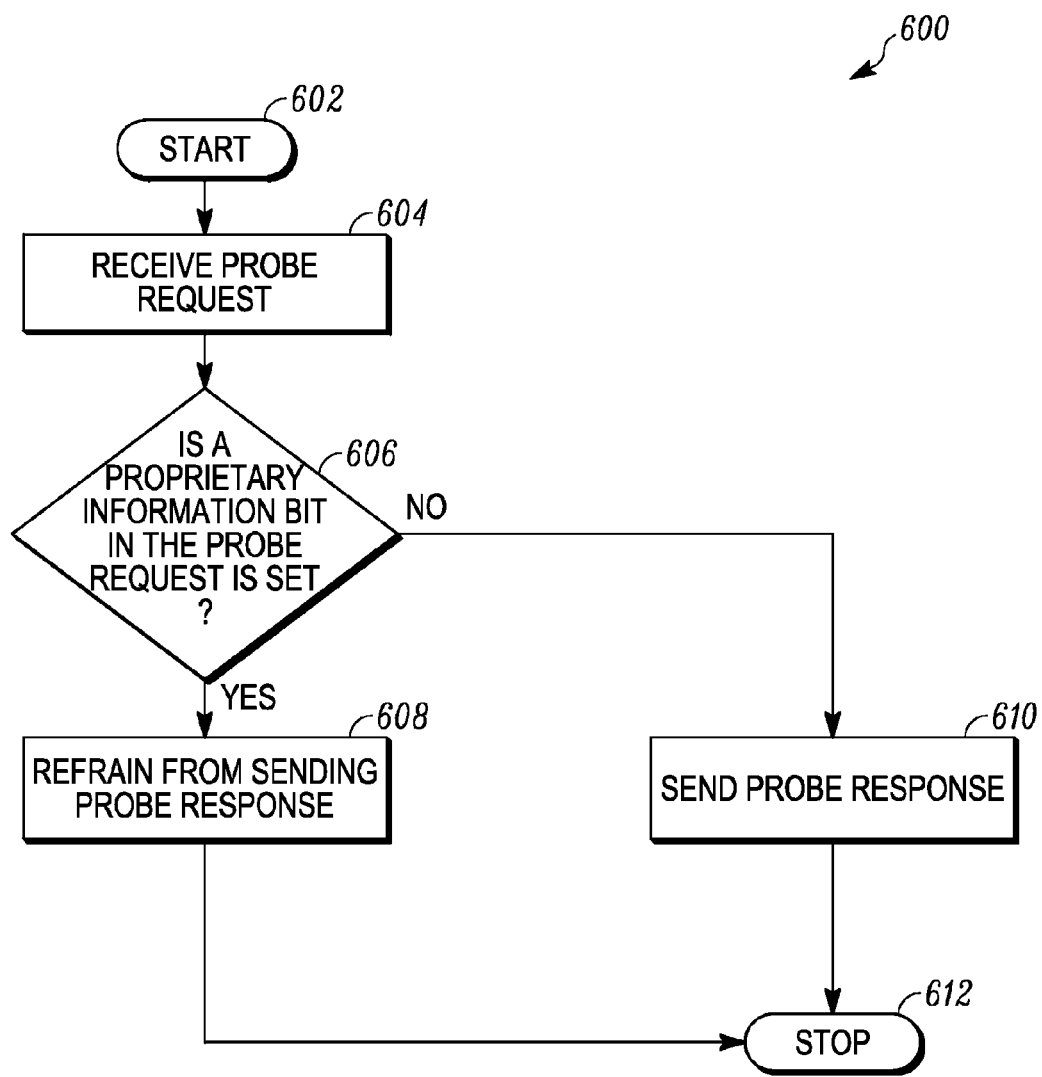
FIG. 6 illustrates a flow diagram of a method for detecting a rogue access point in a communication network in accordance with some embodiments.

FIG. 6 is a flow diagram of a method 600 performed by an access point, for example, the AP (one of 110-1, 110-2, and 110-3) in the communication network 100, in accordance with some embodiments. The method 600 is performed by the AP 110-1, 110-2, 110-3 when in a normal mode of operation.

Referring to the method 600, upon initialization 602, the AP 110-1, 110-2, 110-3 receives 604 a broadcast probe request with a proprietary information bit. A status of the proprietary information bit indicates the AP 110-1, 110-2, 110-3 whether to respond or not to the probe request. In one embodiment, the probing unit includes at least one of the client devices 120-1 through 120-6 in the communication network 100. The AP 110-1, 110-2, 110-3 receives the broadcast probe request from the at least one client device. In another embodiment the probing unit can be one of the APs, for example, AP 110-1, operating in a probe mode. The other APs, for example, APs 110-2 and 110-3 receive the broadcast probe request from the AP operating in the probe mode.

Returning to the method 600, after receiving 604 the probe request the AP 110-1, 110-2, 110-3 determines 606 whether a proprietary information bit is set in the received probe request. If the proprietary information bit is not set the AP 110-1, 110-2, 110-3 understands that the probe request is a normal probe request and sends 610 a probe response and stops 612 the method 600. On the other hand, if the proprietary information bit is set the AP 110-1, 110-2, 110-3 understands that the probe request is for rogue AP detection and refrains 608 from responding to the probe request and stops 612 the method 600.

Figure 7:
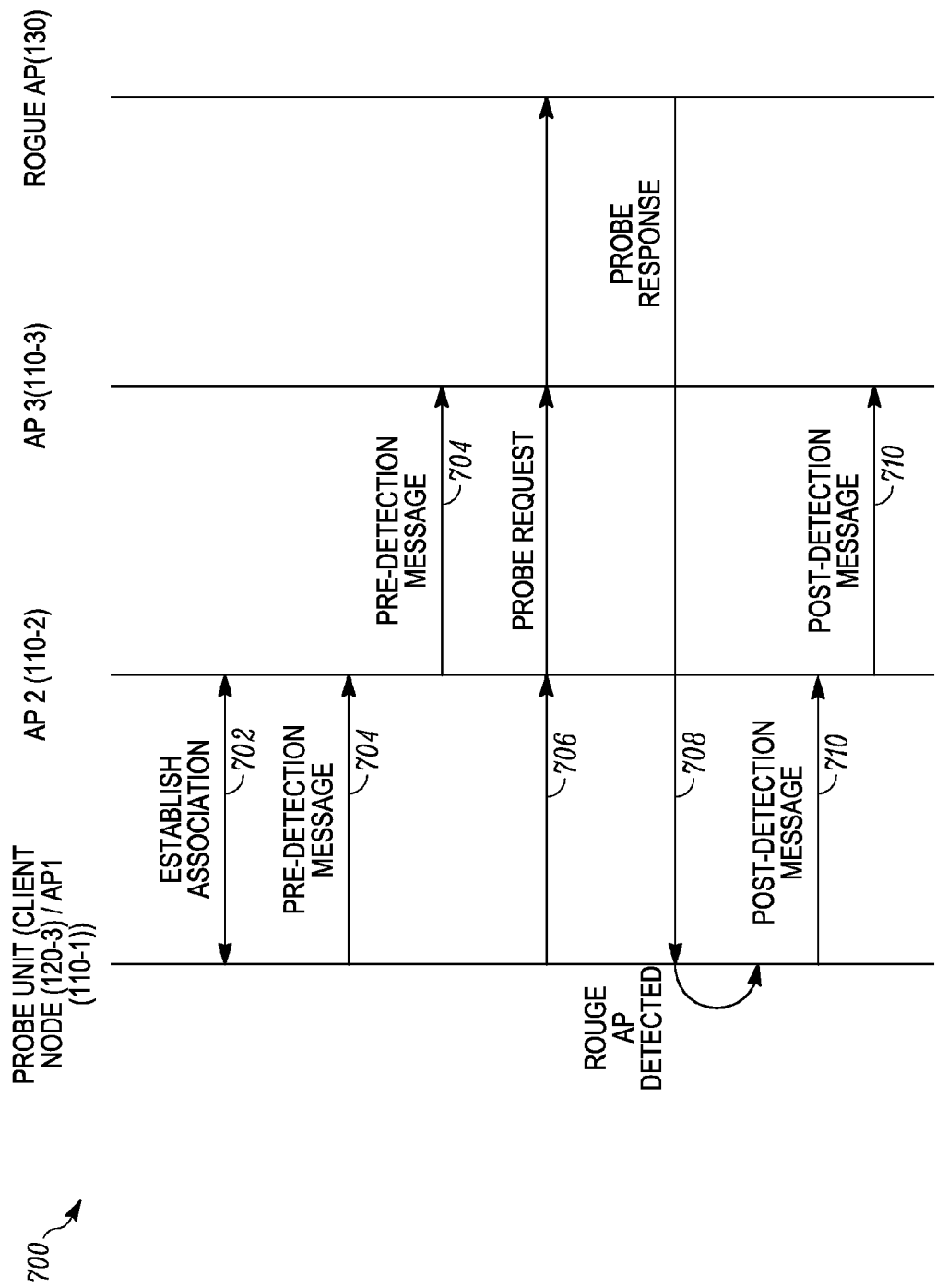
FIG. 7 illustrates a signal flow diagram of a method for detecting a rogue access point in a communication network in accordance with some embodiments.

FIG. 7 is a signal flow diagram 700 describing the flow of signals between different devices for detecting a rogue access point in the communication network 100 in accordance with some embodiments. The signal flow diagram 700 describes the flow of signals between at least one probing unit, the plurality of APs 110-1, 110-2, 110-3, and the rogue AP 130. In one embodiment, the probing unit is a client device, for example, client device 120-3. In another embodiment, the probing unit is an access point, for example, AP 110-1. The probing unit signals 702 to establish an association with an AP, for example, AP 110-2. After association the probing unit sends a pre-detection message 704 to the associated AP 110-2. The associated AP further forwards the pre-detection message 704 to other APs, for example, AP 110-3 in the communication network. The pre-detection message informs the APs 110-2, 110-3 not to respond to the following probe request. The probing unit then broadcasts a probe request 706 to all the authorized APs, for example, APs 110-2, 110-3 and the rogue AP 130. The APs 110-2, 110-3 that received the pre-detection message, understands that the probe request is for rogue AP detection, and does not respond back. Since the pre-detection message was not sent to the rogue AP 130, the rogue AP 130 is not aware that the probe request is sent to detect it and sends a probe response 708. The probing unit detects the rogue AP 130 based on the probe response 708. After detecting the rogue AP 130, the probing unit sends a post-detection message 710 to the associated AP, for example, AP 110-2, which in turn forwards the post-detection message 710 to other authorized APs, for example, AP 110-3, indicating the end of the rogue detection AP mode.

Figure 8:
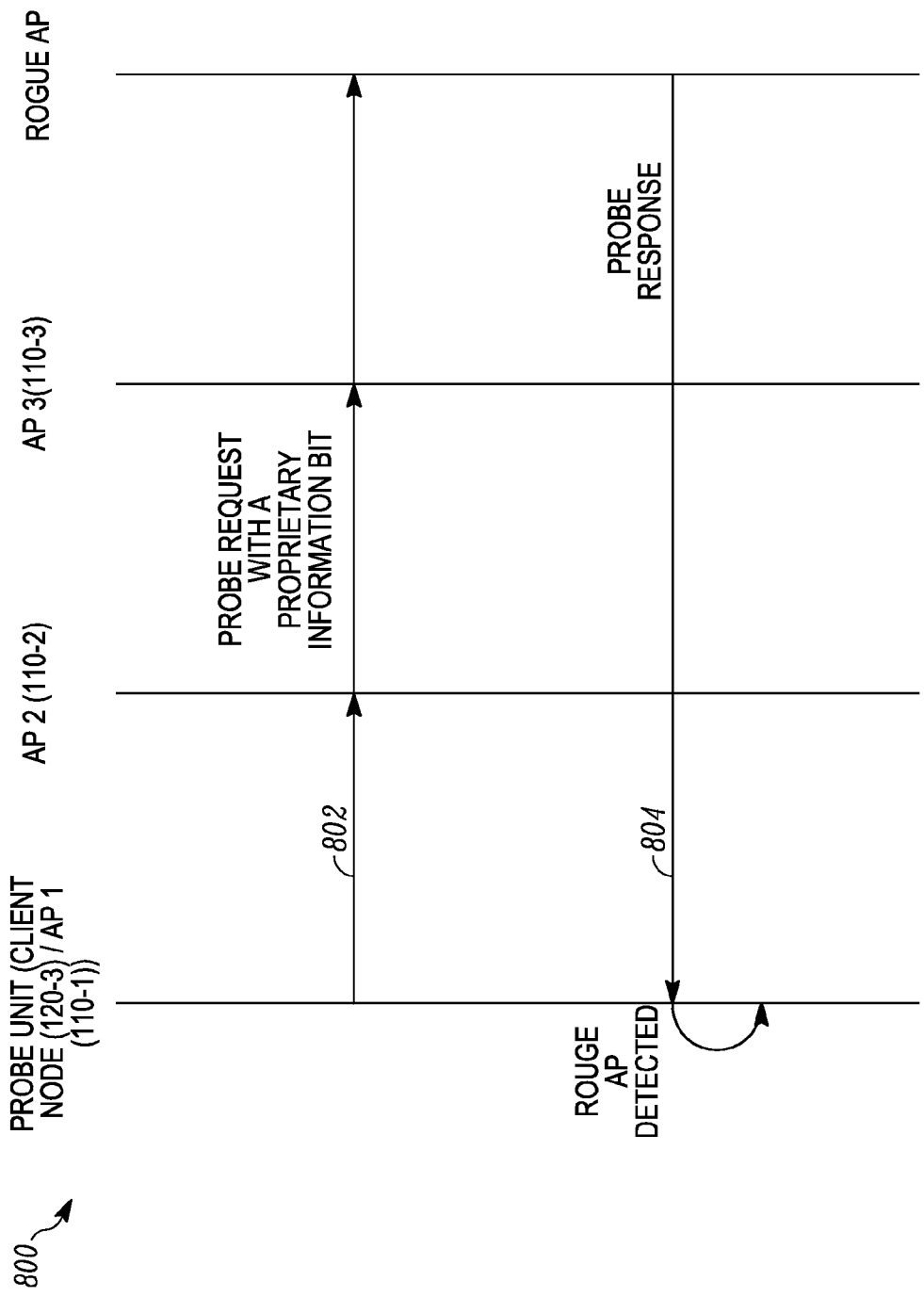
FIG. 8 illustrates a signal flow diagram of a method for detecting a rogue access point in a communication network in accordance with some embodiments.

FIG. 8 is a signal flow diagram 800 describing the flow of signals between different devices for detecting a rogue access point in the communication network 100 in accordance with some embodiments. The signal flow diagram 800 describes the flow of signals between at least one probing unit, the plurality of APs 110-1, 110-2, 110-3, and the rogue AP 130. In one embodiment, the probing unit is a client device, for example, client device 120-3. In another embodiment, the probing unit is an access point, for example, AP 110-1. The probing unit broadcasts a probe request 802 with a proprietary information bit set. The proprietary information bit indicates the APs, for example, APs 110-2, 110-3, authorized to the communication network 100 not to respond to the probe request. The APs 110-2, 110-3 detect the proprietary information bit is set, understands that the probe request is for rogue AP detection, and does not respond back. However, the rogue AP 130 is not aware of the proprietary information bit and therefore sends a probe response 804. The probing unit detects the rogue AP based on the probe response 804.

Advantages of the various embodiments include: enabling the detection of a rogue access point in a communication network in a simple way. The present method enables active detection of rogue access points by sending proprietary information to the authorized APs indicating not to respond to a probe request, broadcasting the probe request to the authorized APs and the rogue AP, and detect the rogue AP based on a probe response from the rogue AP. The other advantages include the client detecting the rogue AP before associating with an AP in the communication network and reporting the detection of rogue AP to an authorized AP in the network through a proprietary message. The client can also send a report of the detection of rogue AP, upon receiving a request from an AP to which it is associated with. The APs can also detect the rogue AP by operating in a probe mode and can inform the detection of rogue AP to other authorized APs in the network using proprietary messages or by triggering an alarm. Those skilled in the art will realize that the above recognized advantages and other advantages described herein are merely illustrative and are not meant to be a complete rendering of all of the advantages of the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for detecting a rogue access point in a communication network comprising a probing unit authorized in the network, a plurality of client devices, and a plurality of access points, the method comprising:
   operating the probing unit to:
      associate with at least one of the plurality of access points, wherein the associated access point is an authorized access point in the communication network;
      send a pre-detection message to the associated access point, wherein the pre-detection message indicates a start of rogue access point detection mode and informs the associated access point not to respond to at least one of a plurality of probe requests following the pre-detection message;
      broadcast at least one probe request in the communication network after sending the pre-detection message and during the detection mode, wherein authorized access points in the plurality of access points being previously instructed to not to respond to the at least one probe request; and
      detect that one or more of the plurality of access points is the rogue access point based on receiving a probe response in reply to the broadcasted probe request from the rogue access point during the detection mode.

2. The method of claim 1 further comprising:
   sending, by the associated access point, the pre-detection message to the other plurality of access points authorized to the communication network and informing the other plurality of authorized access points not to respond to at least one probe request following the pre-detection message.

3. The method of claim 2 further comprising:
   operating the probing unit to:
   send a post-detection message to the associated access point indicating end of rogue access point detection mode.

4. The method of claim 3 further comprising:
   sending, by the associated access point, the post-detection message to the other plurality of authorized access points indicating the end of rogue access point detection mode.

5. The method of claim 4, wherein the pre-detection message and the post-detection message are proprietary messages specific to the communication network.

6. The method of claim 1 further comprising:
   operating the probing unit to:
   determine whether a predetermined time period expires when no probe response is received; and
   send a post-detection message when the predetermined time period expires and when no probe response is detected.

7. The method of claim 3, wherein the plurality of access points operate in a normal mode outside of the detection mode.

8. The method of claim 1, wherein the probing unit includes at least one of the plurality of client devices in the communication network.

9. The method of claim 1, wherein the probing unit includes at least one of the plurality of access points operating in a probe mode.

10. A method for detecting a rogue access point in a communication network comprising a probing unit authorized in the network, a plurality of client devices, and a plurality of access points, the method comprising:
    operating an authorized plurality of access points to:
       receive a pre-detection message from the probing unit associated with the at least one access point, wherein the pre-detection message indicates a start of rogue access point detection mode and informs the authorized access points not to respond to at least one of a plurality of probe requests following the pre-detection message;
       receive at least one of a plurality of probe requests broadcast by the probing unit after receiving the pre-detection message and during the detection mode;
       refrain from responding to probe requests during the detection mode.

11. The method of claim 10 further comprising:
    operating the at least one access point to:
    respond to probe requests after a post-detection message is received.

12. The method of claim 10, wherein the plurality of access points operate in a normal mode outside of the detection mode.

* * * * *